United States Patent [19]
Minami

[11] Patent Number: 5,668,627
[45] Date of Patent: Sep. 16, 1997

[54] OPTICAL LINE TESTING DEVICE AND METHOD FOR AUTOMATICALLY AND EFFICIENTLY MEASURING PROPERTIES OF THE OPTICAL LINE

[75] Inventor: Takao Minami, Tokyo, Japan

[73] Assignee: Ando Electric Co., Ltd., Tokyo, Japan

[21] Appl. No.: 635,490

[22] Filed: Apr. 22, 1996

[30] Foreign Application Priority Data

Apr. 28, 1995 [JP] Japan .................................. 7-106663

[51] Int. Cl.$^6$ .................................................. G01N 21/88
[52] U.S. Cl. ............................................................ 356/73.1
[58] Field of Search ............................................. 356/73.1

[56] References Cited

U.S. PATENT DOCUMENTS 4,898,463  2/1990  Sakamoto et al. .................... 356/73.1
5,450,191  9/1995  Parks et al. ........................... 356/73.1

*Primary Examiner*—Vincent P. McGraw
*Attorney, Agent, or Firm*—Finnegan, Henderson, Farabow, Garrett & Dunner, L.L.P.

[57] ABSTRACT

In an optical line testing device, light pulses are radiated to an optical line so as to receive response light, corresponding to each of the light pulses reflected by the optical line, for a certain period of time. The response light is converted to waveform data. The waveform data are averaged to create averaged data. The averaged data are stored in a memory and are also used to visually display a response waveform corresponding to the response light. A human operator manipulates an operator console while looking at the response waveform so as to analyze the response waveform, thus detecting a property of the optical line. A data range is set between first data and last data selected from among the averaged data representing the response waveform. According to an optical line testing method, the data range is partitioned into several regions so that an approximate line is calculated, using a method of least squares, with respect to each of the regions. Based on the relationship between the approximate line and the level of the response waveform, the property of the optical line is measured with respect to a terminal end of the optical line, a position of Fresne's reflection, and a connection loss of the optical line.

8 Claims, 10 Drawing Sheets

APPROXIMATE LINE $y_{30} = a_{30}x + b_{30}$

OPTICAL LINE TESTING DEVICE AND METHOD FOR AUTOMATICALLY AND EFFICIENTLY MEASURING PROPERTIES OF THE OPTICAL LINE

BACKGROUND OF THE INVENTION

1. Field of the Invention

The invention relates to devices and methods of testing optical lines which consist of optic fiber cables and connectors interconnecting them.

2. Prior Art

FIG. 12 is a block diagram showing a configuration of a conventional optical line testing device. Herein, 'A' designates an optical line (or a light transmission path) which is an object to be measured (or tested) by the device. In addition, there are provided a light pulse tester 1, optic fiber cables 2a to 2d, connectors 3a to 3c and a cable terminal set 4, wherein the optic fiber cables are interconnected together by the connectors. The light pulse tester 1 generates light pulses which are radiated to the optical line A. The light pulses propagate through the optic fiber cables 2a to 2d and the connectors 3a to 3c; then, the light pulses are reflected by the cable terminal set 4. So, the light pulses reflected propagate backward through the optical fiber cables 2a to 2d and the connectors 3a to 3c, so that they are returned to the light pulse tester 1. Thus, intensity of light is detected with respect to reflected light (or response light; i.e., reflected light pulse).

FIG. 13 shows an example of a response waveform, representing the response light, which is visually displayed on a screen of a display unit (not shown). Herein, each of waveform portions 5a to 5d indicates backward scattered light which exists within a space of an optic fiber cable. Based on a gradient of each waveform portion, it is possible to calculate a loss for each of the optic fiber cables 2a to 2d. Each of waveform portions 6a to 6c indicates Fresnel's reflection which occurs at each of the connectors 3a to 3c; and a waveform portion 7 represents Fresnel's reflected light at the cable terminal set 4. As described above, the light pulses, which are radiated from the light pulse tester 1, are subjected to scattering and reflection at some points of the optical line A; therefore, the display unit visually displays the response waveform of the response light which corresponds to sum of scattered light and reflected light.

In the conventional optical line testing device, a variety of switches and keys, which are provided on a panel face of an operation panel (not shown), are manipulated by a human operator to perform measurement on the waveform portions 5a to 5d, 6a to 6c and 7, in the response waveform of the response light, with respect to some items which are determined in advance. Thus, it is possible to measure lengths of the optic fiber cables 2a to 2d as well as positions and connection losses of the connectors 3a to 3c. In such measurement operations, simple manipulation of the keys should be frequently repeated. For example, in order to perform measurement on the aforementioned optical line with respect to connection loss, the conventional optical line testing device is controlled as follows:

At first, an LD key is manipulated to activate the light pulse tester 1, so that light pulses are radiated to the optical line A. Then, an AVERAGE key is manipulated to average an amount of response light which is received by the light pulse tester 1 in a certain period of time. After finishing the averaging, the LD key is manipulated again to stop operation of the light pulse tester 1.

FIG. 14 is an enlarged view showing a selected part of the response waveform shown in FIG. 13. Now, a SHIFT key is used to set a position of a measuring point on the response waveform, so that a visually displayed part of the response waveform is shifted in a desired direction. A rotary nob is manipulated to move a cursor 9 and locate it at a marker 8a, representing the measuring point, on the response waveform. Then, a MARKER key is used to select one of other markers 8b to 8d. If the marker 8b is selected, the display unit visually displays the level of the measuring point, which is designated by the marker 8a, as well as the level of a point designated by the marker 8b on the screen. So, level-entry work is carried out by reading values of those levels. A series of measuring operations, described above, are repeatedly carried out by manipulation of the MARKER key and rotary nob with respect to each Fresnel's reflection. After completion of the measuring operations, a SAVE key is manipulated so that all results of measurement are stored in a certain memory.

In the conventional optical line testing device, every time measurement is carried out with respect to one light transmission path, it is necessary to make settings for the cursor and markers by manipulating the aforementioned keys with respect to a specific point of Fresnel's reflection; and it is necessary to read a position of Fresnel's reflection and a connection loss as well. So, the conventional device should repeat the same operations with respect to other points of Fresnel's reflection. In other words, the conventional device suffers from a problem that measurement cannot be made simultaneously for multiple measuring points. In addition, there is another problem that as compared to time required for measurement in level of the measuring point, such time should be required for the settings of the cursor and markers.

Instead of the aforementioned optical line testing device, another device, having an event function, which is capable of carrying out measurement on multiple measuring points simultaneously. This type of device is designed such that a return loss, which is lower than a predetermined level, is automatically detected from the response waveform; and then, results of the measurement are displayed in the form of a list with respect to points on which the above automatic detection is performed. In other words, this type of device is designed to automatically perform detection of Fresnel's reflection whose return loss is lower than the predetermined level. This indicates that a measuring point is moved in response to a response waveform. In other words, it is not always possible for a human operator to perform measurement on a desired measuring point. In short, there is a problem that measurement is performed with respect to a measuring point which is not desired by the human operator. In addition, there is another problem in that precision of measurement is lowered in the case of a curved response waveform or in the case of a response waveform whose noise level is relative large. Moreover, there is a need to develop an advanced measuring function which is capable of automatically performing measurement on multiple measuring points without repeating a same work using manual operations described above.

SUMMARY OF THE INVENTION

It is an object of the invention to provide an optical line testing device and an optical line testing method by which measurement can be automatically performed on properties of optical lines with a high efficiency as well as a high precision.

The invention provides an optical line testing device wherein light pulses are radiated to an optical line so as to receive response light, corresponding to each of the light pulses reflected by the optical line, for a certain period of time, so that the response light is converted to waveform data. A plurality of waveform data are averaged to create averaged data. The averaged data are stored in a memory and are also used to visually display a response waveform corresponding to the response light. A human operator manipulates an operator console with looking at the response waveform so as to analyze the response waveform, thus automatically detecting property of the optical line.

Now, a data range is set between first data and last data selected from among the averaged data representing the response waveform. According to an optical line testing method, the data range is partitioned into a plurality of regions so that an approximate line is calculated, using a method of least squares, with respect to each of the regions.

As the property of the optical line, an end terminal of the optical line is detected by performing comparison between the response waveform and a threshold value which is set responsive to the approximate line at the last data. Secondly, a position of Fresnel's reflection is determined by performing comparison between the response waveform and a straight line which is formed based on the approximate line added with a constant, wherein the constant is set responsive to a deviation between the approximate line and an average value among data belonging to each region. Lastly, a connection loss of the optical line is calculated based on a difference between two approximate lines which are newly formed with respect to two sides of a peak portion of the response waveform at the position of Fresnel's reflection.

Moreover, occurrence of multiple Fresnel's reflection is detected by evaluating the peak portion of the response waveform corresponding to the position of Fresnel's reflection.

Through the invention, it is possible to automatically measure the property of the optical line, from its near end to its far end, at high precision.

BRIEF DESCRIPTION OF THE DRAWINGS

These and other objects of the subject invention will become more fully apparent as the following description is read in light of the attached drawings wherein.

DESCRIPTION OF THE PREFERRED EMBODIMENT

Figure 1:
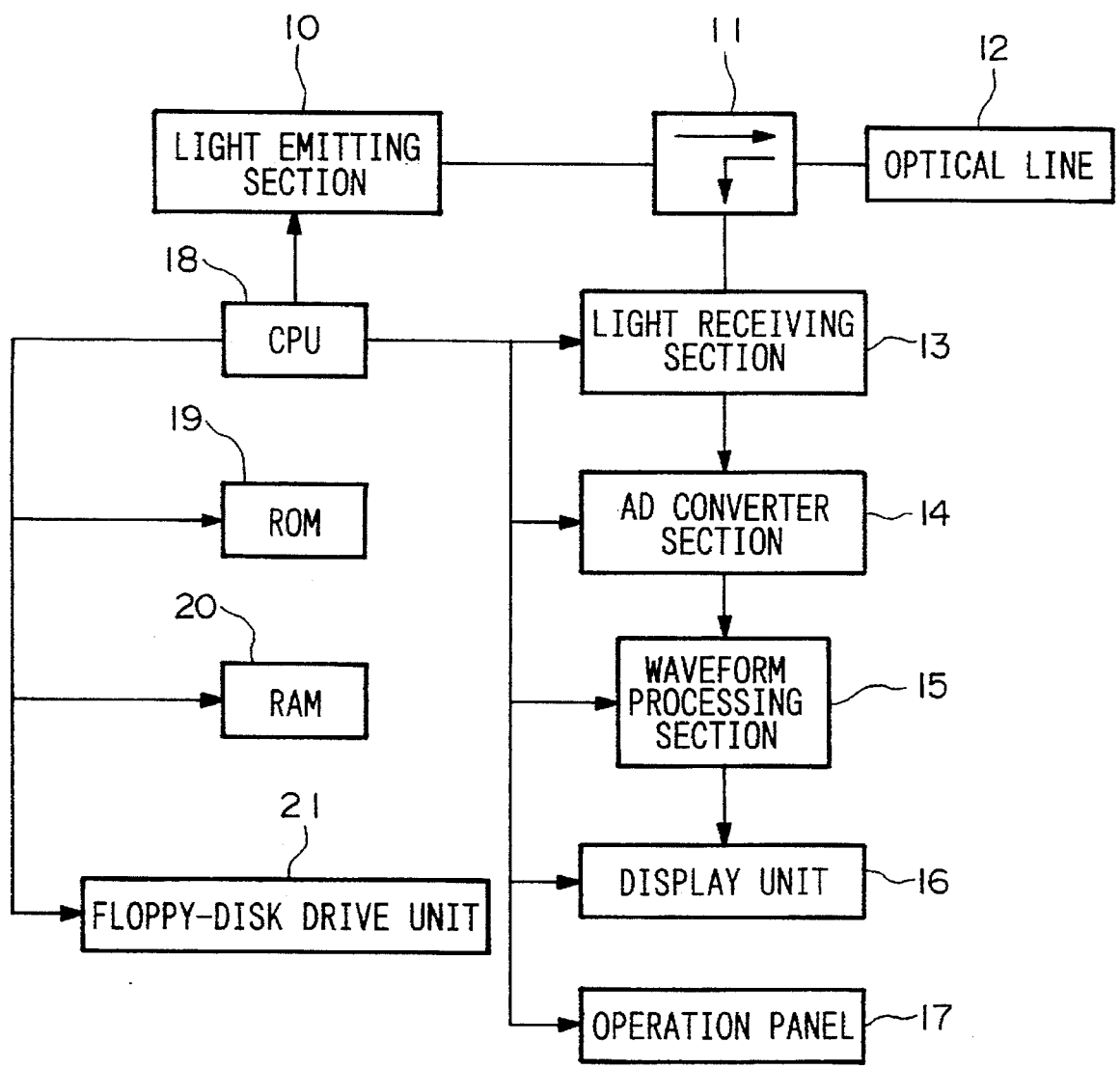
FIG. 1 is a block diagram showing a configuration of an optical line testing device which is designed in accordance with an embodiment of the invention.

FIG. 1 is a block diagram showing a configuration of an optical line testing device which is designed in accordance with an embodiment of the invention. Herein, there are provided a light emitting section 10, a directional connector set 11, an optical line 12, a light receiving section 13, an AD converter section (i.e., analog-to-digital converter section) 14, a waveform processing section 15, a display unit 16, an operation panel (or operator console) 17, a CPU (i.e., central processing unit) 18, a ROM (i.e., read-only memory) 19, a RAM (i.e., random-access memory) 20 and a floppy-disk drive unit 21.

Under control of the CPU 18, the light emitting section 10 emits light pulses toward directional connector set 11. The directional connector set 11 transmits the light pulses, emitted by the light emitting section 10, to the optical line 12. In addition, the directional connector set 11 receives reflected light from the optical line 12 so as to transmit it to the light receiving section 13. The light receiving section 13 converts the reflected light to electric signals, which are outputted to the AD converter section 14. In the AD converter section 14, the electric signals (i.e., analog signals) are amplified based on a specific amplification rate; and then, the analog signals amplified are converted to digital signals. The digital signals are supplied to the waveform processing section 18.

The above digital signals, representing response waveform data, correspond to reflected light which occurs with respect to light pulses outputted by the light emitting section 10 in a certain period of time. The waveform processing section 15 performs an averaging process on the response waveform data so as to produce averaged data. Then, the averaged data are converted to logarithmic values, which are outputted to the display unit 18. The display unit 16 operates based on the averaged data to visually display a waveform of the response light, after it has been subjected to the averaging process, on a screen. In addition, the display unit 16 displays positions of Fresnel's reflection and connection losses of connection points, based on the averaged data, in a form of a list on the screen.

The operation panel 17 is arranged on a front face of a body of the optical line testing device; and the operation panel 17 provides a plurality of keys which can be manipulated by a human operator. By manipulating those keys, a variety of measurement conditions are set for measurement work of the response waveform. For example, it is possible to have settings for ON/OFF operations of the light emitting section 10, auto-splice operations (i.e., automatic measurement for positions of Fresnel's reflection and connection points on a waveform) and operation to store results of measurement.

The CPU 18 controls operation of the optical line testing device in accordance with control programs which are stored in the ROM 19. Details of the control operation of the CPU 18 will be described later. The ROM 19 stores the control programs, control data which are required for execution of the control programs, and display data representing characters and the like which are displayed by the display unit 16 in response to manipulation of the operation panel 17. Working areas are set in the RAM 20, and registers are provided to temporarily store calculation data for execution of the control programs. In addition, the RAM 20 stores waveform data which are processed by the waveform processing section 15. The floppy-disk drive unit 21 performs reading or writing of the waveform data from or to a floppy disk.

Next, operation of the optical line testing device of FIG. 1 will be explained in detail.

At first, if conditions of measurement are entered by the operation panel 17 and then a test-start key is depressed, testing is started with respect to the optical line 12. The CPU 18 controls the light emitting section 10 in accordance with the control programs which are stored in the ROM 19 so that the light emitting section 10 emits light pulses, having a constant period, to the directional connector set 11. The light pulses pass through the directional connector set 11 as test light. Thus, the test light is inputted to an end face of the optical line 12 which is an object to be tested. The light pulses propagate through the optical line 12. So, backward scattering light and Fresnel's reflection light are created through a process of the propagation. Then, response light consisting of the backward scattering light and Fresnel's reflection light is outputted from the end face of the optical line 12 to which the aforementioned light pulses were inputted.

The response light passes through the directional connector set 11, by which the response light is delivered to the light receiving section 13. In short, the directional connector set 11 works in such a manner that light, which is inputted from the light emitting section 10, is delivered to the optical line 12, while light, which is inputted thereto from the optical line 12 is delivered to the light receiving section 13. The light receiving section 13 receives the response light from the directional connector set 11 for a certain period of time. Thus, the response light is converted to electric signals in response to light-receiving level thereof. The electric signals are supplied to the AD converter section 14. In the AD converter section 14, the electric signals are amplified and then converted to digital signals (i.e., response waveform data). Then, the digital signals are supplied to the waveform processing section 15.

The AD converter section 14 performs sampling operation on response light corresponding to each of the light pulses which the light emitting section 10 emits for the certain period of time and which are supplied thereto from the light receiving section 13. Herein, the sampling operation is repeatedly performed on the response light corresponding to each light pulse with respect to maximum 20,000 points; and consequently, AD conversion is completed. In other words, the AD converter section 14 converts the response light, corresponding to each light pulse, into response waveform data, wherein the response waveform data consists of a plurality of data (e.g., maximum 20,000 data), a number of which is determined responsive to a length of the optical line 12.

Figure 2A:
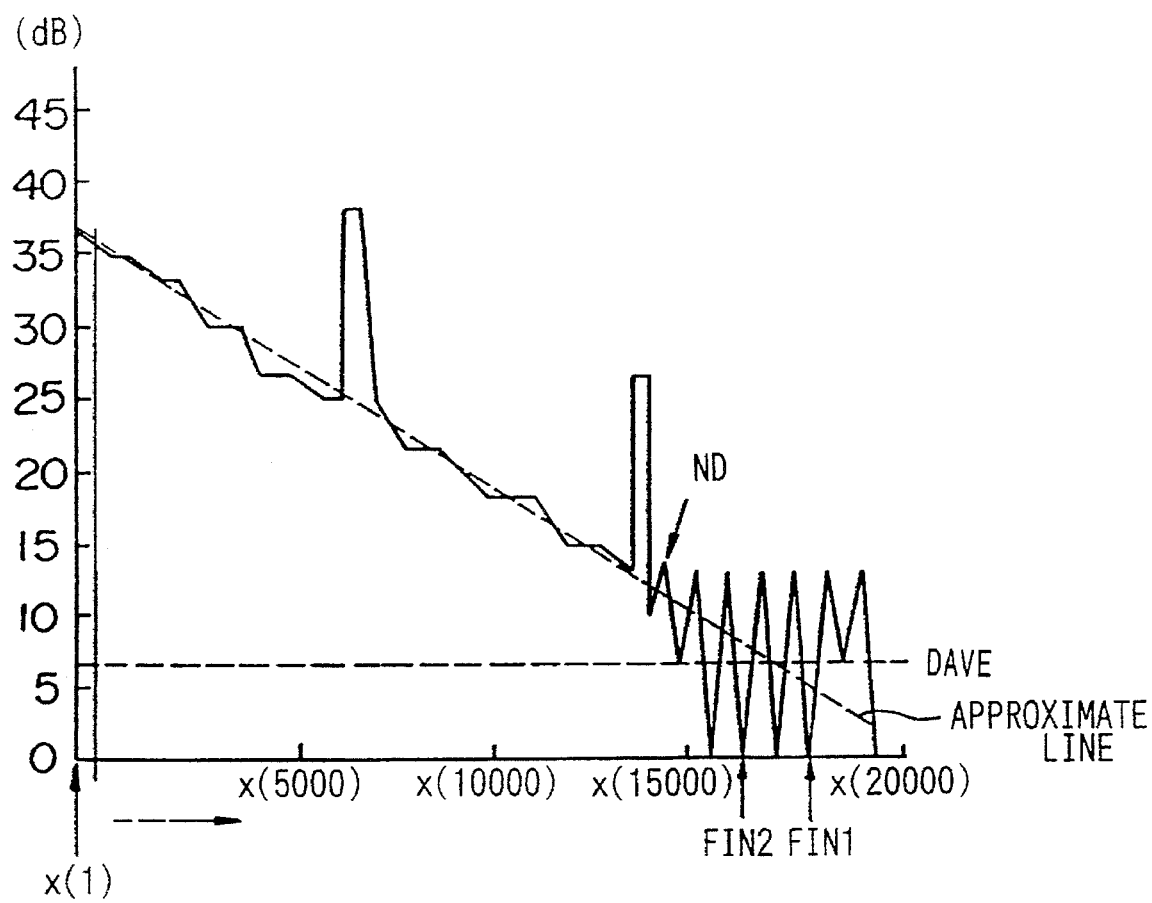
FIG. 2A is a graph showing an example of a response waveform which is visually displayed for a human operator.

The waveform processing section 15 averages the response waveform data corresponding to the response light. For example, if 10 light pulses are emitted for a certain period of time, the waveform processing section 15 receives 10 response waveform data which range from response waveform data 'x1' (which consists of data x1(1) to data x1(20000)) to response waveform data 'x10' (which consists of data x10(1) to data x10(20000)). So, all of the response waveform data x1 to x10 are added together. The result of the addition is divided by '10' which is the number of the response waveform data inputted to the waveform processing section 15 for the certain period of time. In short, the waveform processing section 15 performs an averaging process on a plurality of response waveform data. Then, data obtained through the averaging process are subjected to logarithmic conversion so that averaged data, having values in decibels, are produced. The averaged data, which are a group of data consisting of data x(1) to data x(20000), are stored in the RAM 20. When the operation panel 17 is manipulated to designate a visual-display operation, the display unit 16 operates based on the averaged data, consisting of the data x(1) to data x(20000), so as to display a waveform of response light on the screen. FIG. 2A is a graph showing an example of a waveform of response light which is displayed by the display unit 16. This waveform is displayed based on the averaged data "x(1) to x(20000)", wherein the light-receiving level is measured with respect to each of 20,000 points of response waveform so that result of measurement is displayed using values in decibels.

Figure 2B:
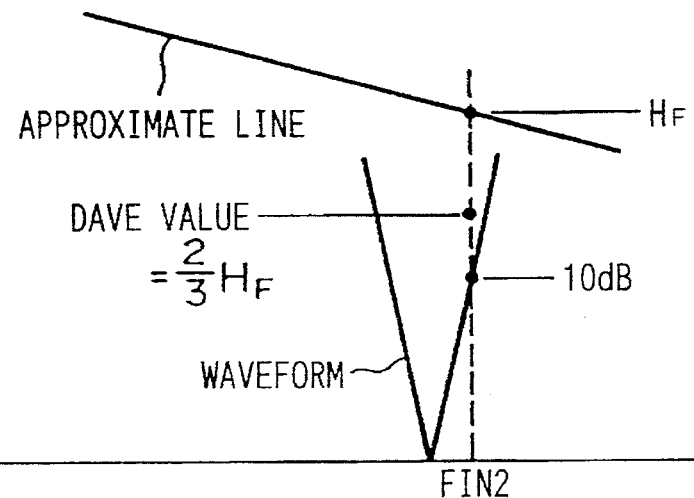
FIG. 2B is an enlarged view showing a selected part of the graph of FIG. 2A which is used to explain calculation of a DAVE value.

In the graph of FIG. 2B, a horizontal axis represents the averaged data x(1) to x(20000), wherein each data represents an intensity of response light which is measured at each of the positions of the optical line 12 having a fixed length. Specifically, the averaged data x(1) represents intensity of backward scattering light which occurs at a nearest end of the optical line 12, i.e., a portion of the optical line 12 which is closest to the directional connector set 11; and the averaged data x(20000) represents intensity of backward scattering light which occurs at a position farthest from the directional connector set 11.

Position of Fresnel's reflection and connection loss are calculated based on the averaged data which are obtained through processes of the waveform processing section 15. Next, calculations for the position of Fresnel's reflection and connection loss will be explained in detail.

Figure 3:
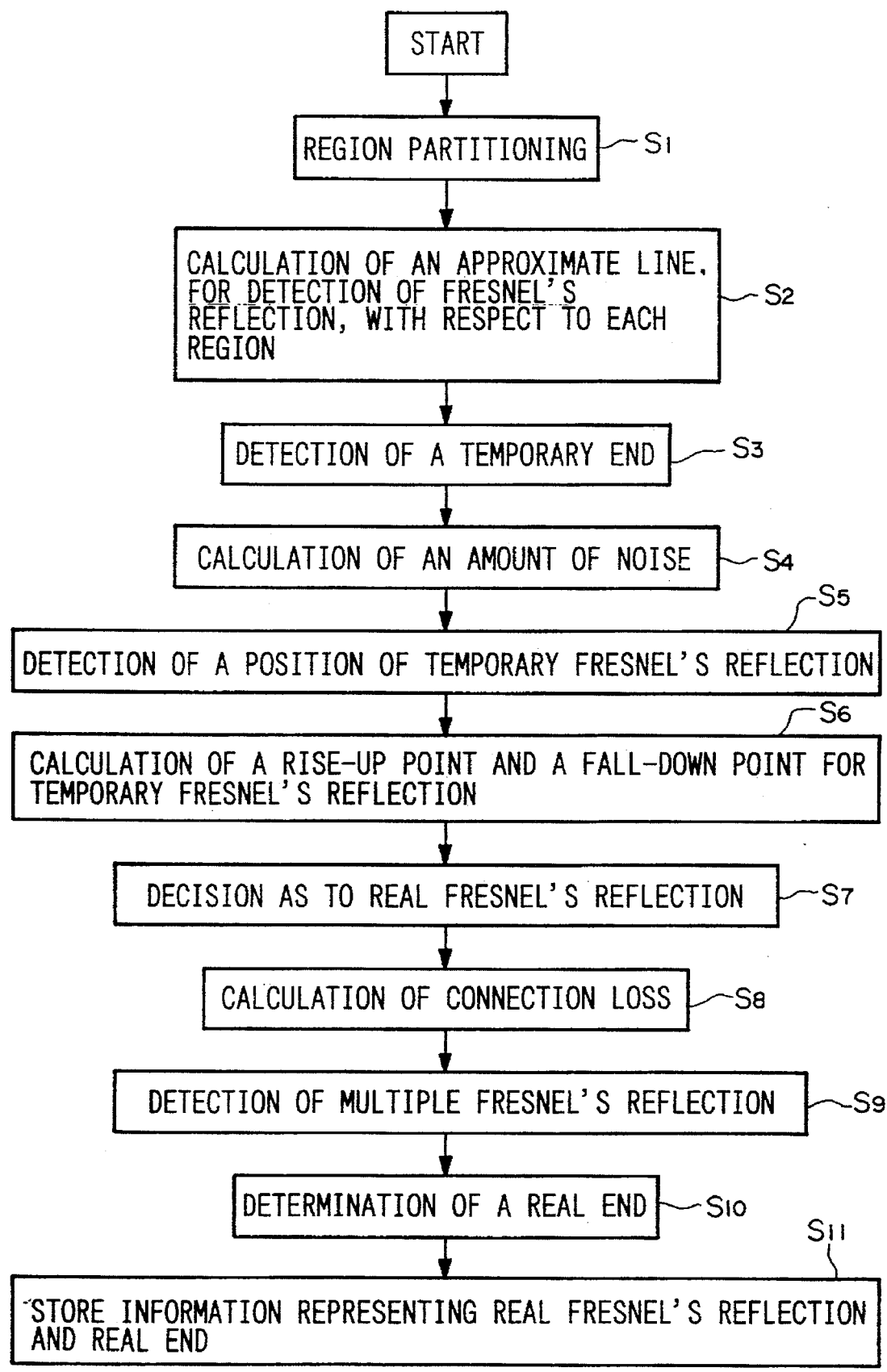
FIG. 3 is a flowchart showing a brief content of a processing program which is executed to perform calculations regarding Fresnel's reflection and optical line.

FIG. 3 shows a flowchart regarding a processing program containing the calculations for the position of Fresnel's reflection and connection loss, wherein the processing program is stored in the ROM 19. The CPU 18 performs processing on the averaged data x(1) to x(20000), stored in the RAM 20, in accordance with the flowchart so as to calculate the position of Fresnel's reflection and connection loss.

When a detection-start key, which is provided on a panel face of the operation panel 17, is manipulated, the CPU 18 proceeds to step S1 in which region partitioning is carried out.

Specifically, the CPU 18 makes confirmation on every twenty data, starting from first averaged data 'x(1)' which corresponds to the nearest end of the optical line 12, with respect to the response waveform shown by FIG. 2A. That is, averaged data x(1), x(21), x(41) . . . are selected from among the averaged data x(1) to x(20000); and then, confirmation is made with respect to the averaged data selected. If the CPU 18 detects four of the averaged data whose light-receiving level is 10 dB or less, the fourth averaged data detected are marked. For example, if averaged data x(19000) corresponds to the fourth averaged data detected, the averaged data x(19000) are marked with a symbol 'FIN1'.

Next, 50 averaged data are counted back from the averaged data x(19000), which are marked with FIN1, in a direction toward the nearest end of the optical line 12 (hereinafter, simply referred to as a nearest-end direction) so as to find out certain averaged data, i.e., averaged data x(18950). Then, a number of averaged data whose level is 10 dB or less is detected from a set of averaged data ranging from the averaged data x(19000) to averaged data x(18950) so as to set a count number. The count number is designated by a symbol 'CT1'. Now, if the count number CT1 is 2 or more, a set of averaged data, on which detection for the number of the averaged data whose level is 10 dB or less is performed, are shifted in the nearest-end direction by one averaged data; thus, the detection is performed on a next set of averaged data.

Namely, the detection for the number of averaged data whose level is 10 dB or less is performed on a next set of averaged data ranging from averaged data x(18949) to averaged data x(18999). If a count number CT1, which is detected with respect to the next set of averaged data, appears to be 2 or more again, shifting of one averaged data is performed again so that the detection is performed on a further set of averaged data. The above detection process is repeated until the count number CT1 becomes equal to '1'. If a count number CT1 of '1' is detected with respect to a certain set of averaged data, certain averaged data within the certain set of averaged data are marked with a symbol 'FIN2'. For example, averaged data x(16000) are marked with 'FIN2'. Then, the step S1 performs region partitioning on a data range between the first averaged data x(1) and the averaged data marked with 'FIN2' (e.g., averaged data x(16000)) in such a way that a number of data included in each region is controlled to be 2,000 or less.

Next, the CPU 18 calculates an approximate line in step S2. That is, the CPU 18 performs calculations, using an algorithm representing a method of least squares and based on data which belongs to each of the regions partitioned by the step S1, so as to produce data representing an approximate line 'ym' (where 'm' represents a region number), as follows:

$$ym = am \cdot x(i) + bm \quad (1)$$

A data range of the averaged data between x(1) and FIN2 is partitioned into a plurality of regions which are represented by region 1, region 2, ..., region m, ... The above equation (1) uses a coefficient 'am' and a constant 'bm' which are calculated with respect to each region.

Figure 4:
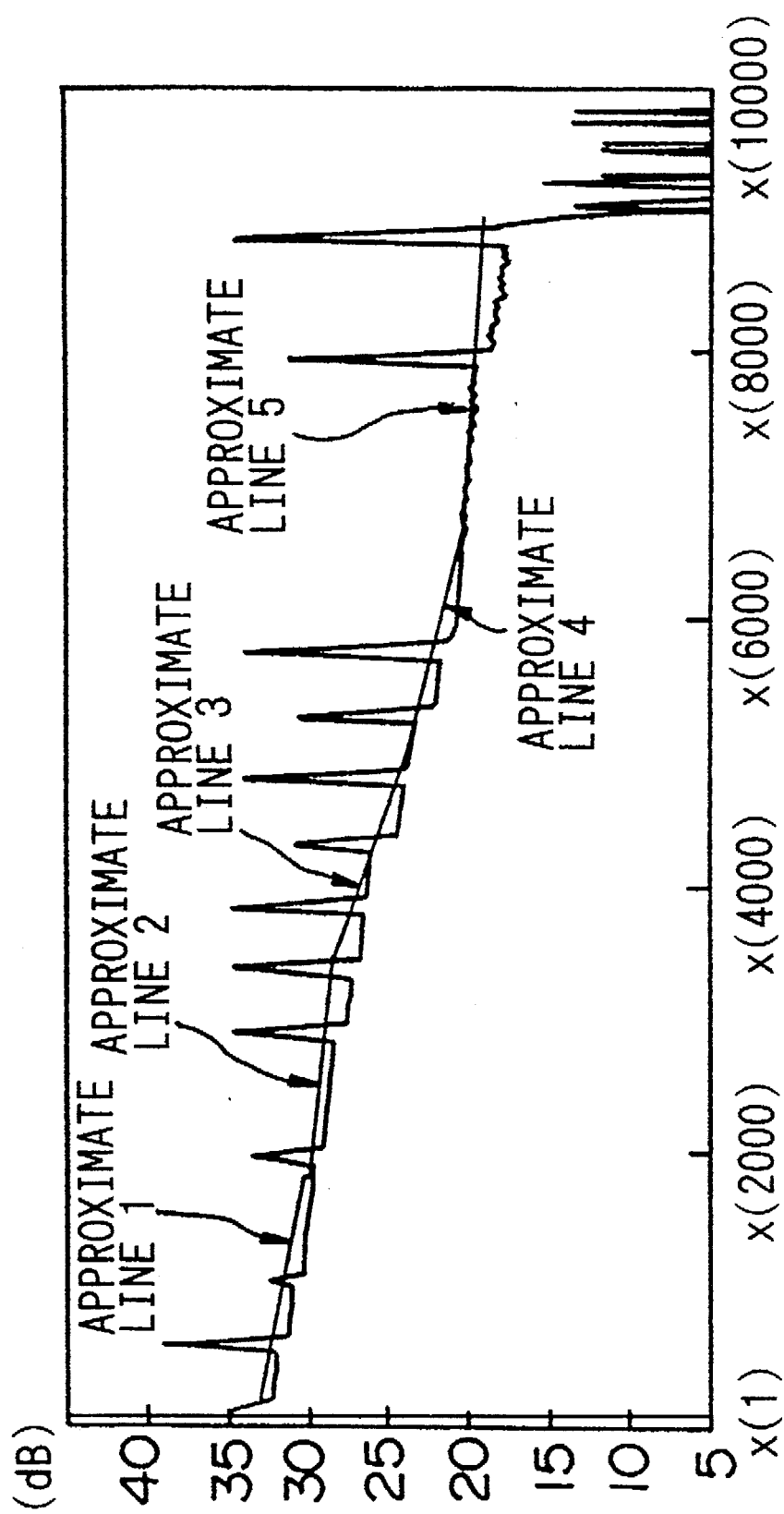
FIG. 4 is a graph showing an example of a response waveform which is used to explain region partitioning.

FIG. 4 diagrammatically shows a series of approximate lines each of which is calculated with respect to each of the regions. Specifically, FIG. 4 shows a waveform of response light with respect to a certain range of measurement (i.e., 20 Km) in the optical line 12, wherein the waveform is represented by a set of averaged data between x(1) and x(10000). A data range of the averaged data between x(1) and x(10000) is partitioned into five regions by the aforementioned method of the step S1; therefore, the CPU 18 performs calculations to produce five approximate lines, numbered from '1' to '5', with respect to the five regions respectively.

In the case of the graph of FIG. 4, averaged data x(9080) are marked with FIN2; therefore, a number of data which belong to a range between x(1) and x(9080) is '9080'. So, if the data range of averaged data between x(1) and x(9080) is partitioned into a plurality of regions each of which contains 2,000 of averaged data or less, the data range should be partitioned into five regions. Therefore, the approximate line 1 is created by processing a set of averaged data between x(1) and x(1812) in accordance with the algorithm representing the method of least squares. Similarly, the approximate line 2 is created based on a set of averaged data between x(1813) and x(3624); the approximate line 3 is created based on a set of averaged data between x(3625) and x(5436); the approximate line 4 is created based on a set of averaged data between x(5487) to x(7248); and the approximate line 5 is created based on a set of averaged data between x(7249) and x(9060), wherein each approximate line is created by the processing using the algorithm of the method of least squares.

Next, the CPU 18 proceeds to step S3 which performs temporary-end detection process, in other words, which performs a process to detect a position of a terminal end of the optical line 12. Details of the temporary-end detection process will be described below with reference to a flow-chart shown in FIG. 5.

In step Sa1, a DAVE value is calculated. FIG. 2B is an enlarged view for a selected part of the graph of FIG. 2A in proximity to FIN2. In FIG. 2B, the approximate line has a value 'HF' at FIN2; then, the value HF is multiplied by $\frac{2}{3}$ to produce the DAVE value. In addition, 'n' represents a data number which is assigned to the averaged data marked with FIN2. So, if averaged data x(16000) are marked with FIN2, the data number n is set at 16000. Further, the count number CT2 is reset to an initial value, i.e., zero.

In step Sa2, six averaged data ranging from a data number 'n' to a data number 'n-5' are selected; and then, an average value MED is calculated from the six averaged data. In next step Sa3, the average value MED is compared to the aforementioned DAVE value. If the average value MED is greater than the DAVE value, the CPU 18 proceeds to step Sa4. If not, the CPU 18 proceeds to step Sa5. In other words, if the average value MED is smaller than the DAVE value, a number of 'n-6' is newly applied to the data number n used by calculation of the step Sa2.

So, in the step Sa2, six averaged data ranging from a data number 'n-6' to a data number 'n-11' are newly selected, so that an average value MED is calculated from the six averaged data newly selected. In the next step Sa3, the average value MED newly calculated is compared to the DAVE value. Thus, the aforementioned processes of steps Sa5 and Sa2 are repeated until the condition of the step Sa3 is satisfied. Due to the series of processes described above, selection for six averaged data is shifted from the averaged data x(16000), marked with FIN2, in the nearest-end direction, so that each average value MED, which is calculated with respect to each set of six averaged data selected, is compared to the DAVE value.

Meanwhile, if the average value MED becomes greater than the DAVE value, the CPU 18 proceeds to step Sa4 in which '1' is added to the count number CT2. Then, the CPU 18 makes a decision as to whether or not the count number CT2 increased by '1' becomes equal to '5'. If the count number CT2 is smaller than 5, the CPU 18 proceeds back to the step Sa5, so that the aforementioned processes are repeated. Namely, by repeating the processes of steps Sa2 to Sa6, the CPU 18 makes a decision as to whether or not the average value MED continuously appears to be greater than the DAVE value for five times in row. If such a condition is satisfied, the CPU 18 proceeds to step Sa7 in which a data number representing a temporary end ND is defined as the sum of the data number n and '30'. Before execution of the step Sa7, the CPU 18 examines five consecutive sets of data to perform the decision; in other words, the fact that the average-value MED appears to be greater than the DAVE value is proved continuously with respect to the five consecutive sets of data. So, certain data, which exists within the five consecutive sets of data, is defined as the temporary end NT. Herein, data of the temporary end NT correspond to a farthest end in a certain part of the optical line 12 whose length is defined by the five consecutive sets of data; in other words, the data of the temporary end NT has a largest data number within the five consecutive sets of data.

Figure 5:
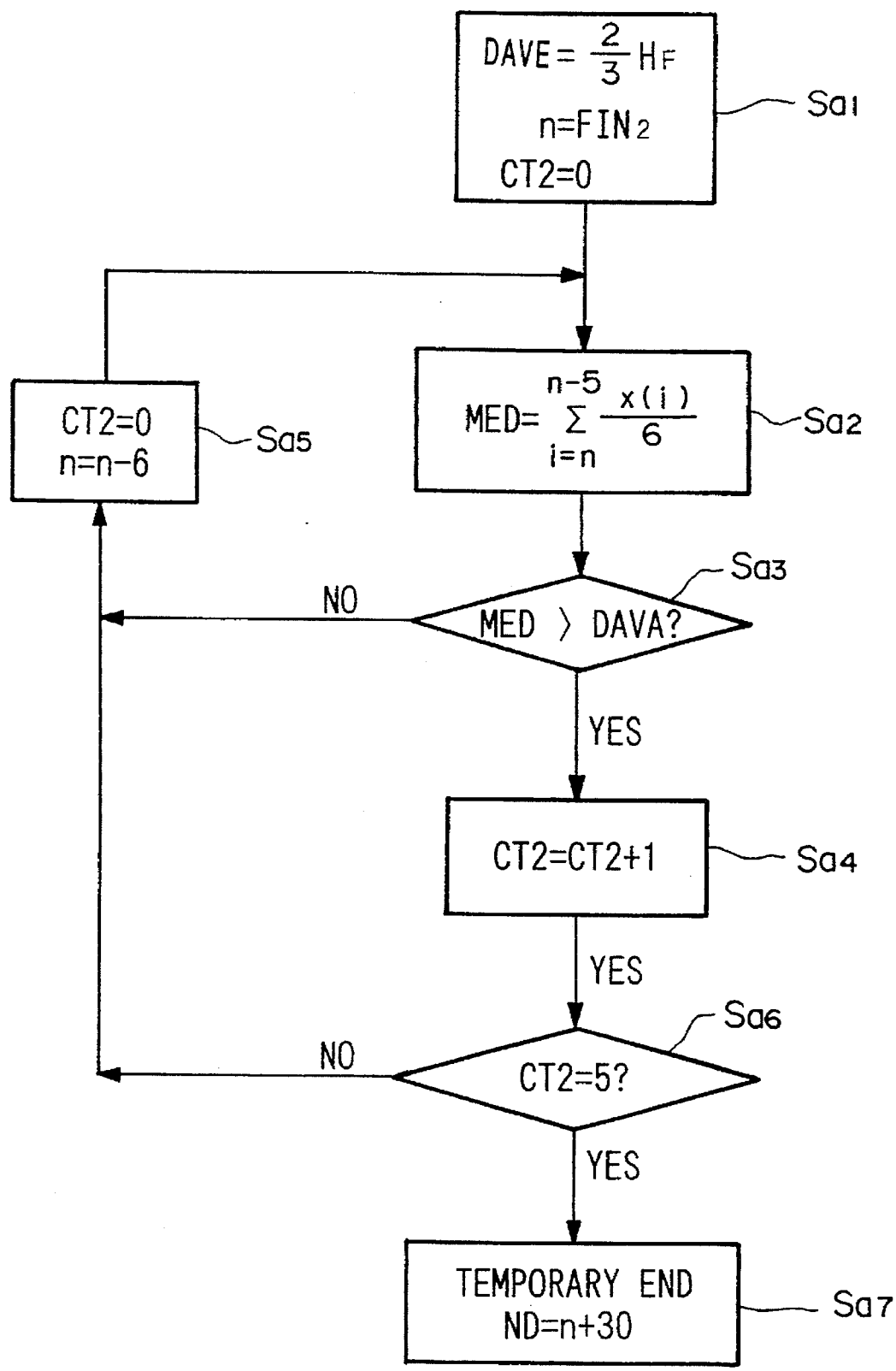
FIG. 5 is a flowchart showing a method of calculating a temporary end.

After completion of the temporary-end detection process of FIG. 5, the CPU 18 proceeds to step S4 shown in FIG. 3. In step S4, the CPU 18 calculates an amount of noise 'Z' with respect to each of the regions, which are partitioned in step S1, and in accordance with an equation, as follows:

$$Zm = \Sigma |x(i+2) + x(i) - 2x(i+1)|/(Nm-2) \quad (2)$$

where 'Nm' represents a number of data which configure each region.

As for a region (where Nm=N1) which corresponds to the approximate line 1 in FIG. 4, for example, there is provided a plurality of averaged data between x(1) and x(1812), a number of which is '1812'. So, if the equation (2) is applied to the approximate line 1, a variable i is set at a value within a numerical range between 1 and 1810 while a numerical value of N1 is set at 1812. So, an amount of noise Z1 for the region 1 is calculated using the above numerical values.

Then, the CPU 18 proceeds to step S5 which first calculates an absolute deviation 'DLV'. The absolute deviation is calculated between an approximate line, which is calculated in step S1, and an average value among data which exist within a region corresponding to the approximate line. Such calculations for the absolute deviation DLV are performed with respect to a number of waveforms in advance. Thus, a value ADLV is obtained by experience, wherein ADLV= 2−1.25·DLV. This value ADLB is used as a constant which is added to the approximate line, so that a threshold value is calculated for detection of a temporary position of Fresnel's reflection.

An example of calculations for detection of a temporary position of Fresnel's reflection will be described with respect to the region 1, as follows:

At first, an average value is calculated among the averaged data x(1) to x(1812); and deviation DLV1 is calculated between the average value and an approximate line y1 corresponding to the region 1. Then, a value ADLV1 is calculated based on the deviation DLV1. The value ADLV1 is added to the approximate line y1 so as to obtain a straight line y1a, as follows:

$$y1a = a1 \cdot x(i) + b1 + ADLV1 \quad (3)$$

This straight line y1a is used as a threshold value for detection of a temporary position of Fresnel's reflection.

Figure 6:
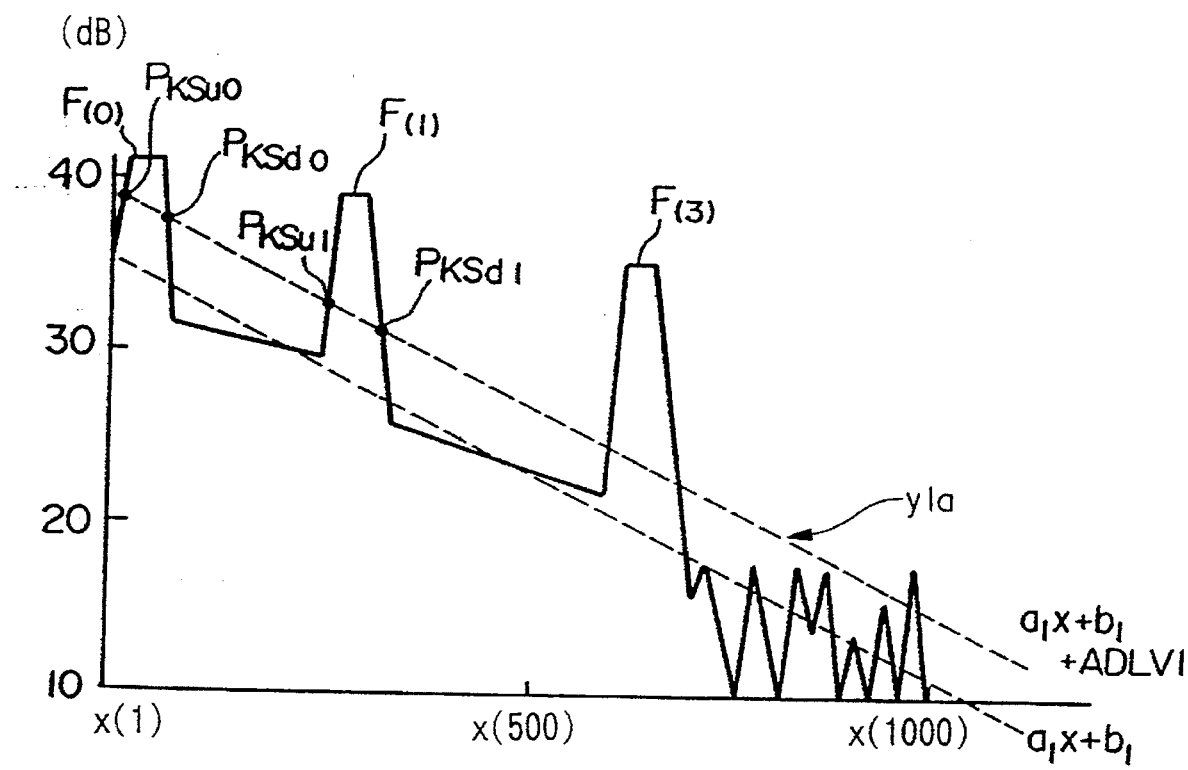
FIG. 6 is a graph showing a response waveform, with a plurality of points of Fresnel's reflection, which is used to explain detection of temporary Fresnel's reflection.

FIG. 6 shows a response waveform in connection with two dotted line, wherein an upper dotted line corresponds to the straight line y1a. The response waveform has several peaks which correspond to Fresnel's reflection F(0), F(1), . . . respectively; and the straight line y1a crosses the response waveform at those peaks, so that a pair of points of intersection are formed between the straight line y1a and the response waveform with respect to each peak. Those points are called a temporary rise-up point 'Pksu' and a temporary fall-downpoint 'Pksd'. So, there are provided a plurality of temporary rise-up points Pksu(0), Pksu(1), . . . and a plurality of temporary fall-down points Pksd(0), Pksd(1), . . . . Then, data numbers of data which respectively correspond to the above points are stored in the RAM 20. Thus, process of the step S5 is completed.

Next, the CPU 18 proceeds to step S6 so as to calculate a rise-up point Pksul(i) and a fall-down point Pksdl(1) with respect to each Fresnel's reflection. Next, an actual method of calculations will be described with respect to the Fresnel's reflection F(1), wherein a rise-up point Pksul(1) and a fall-down point Pksdl(1) are detected.

Figure 7:
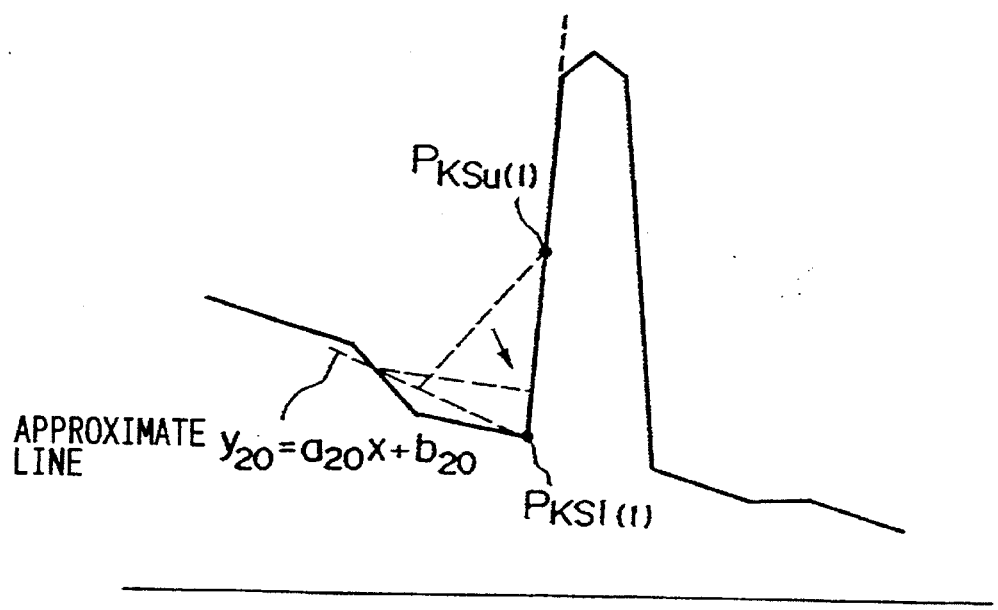
FIG. 7 shows a selected part of the response waveform shown in FIG. 6 which is used to explain detection of a rise-up point of Fresnel's reflection.

First, a method of detection for the rise-up point Pksul(1) will be explained in conjunction with FIG. T. FIG. T is an enlarged view showing a selected part of the graph of FIG. 6 which relates to the Fresnel's reflection F(1). At first, an approximate line is created based on consecutive 60 data which belong to a near-end side (i.e., a left side of FIG. 7) starting from the temporary rise-up point Pksu(1). If a coefficient, representing a gradient of the approximate line, has a positive value, extraction for a set of 60 data is shifted in the left side by some number of data so as to create an approximate line based on a next set of 60 data; and then, a sign of a coefficient, representing a gradient of the approximate line, is detected. The CPU 18 repeats this process for sequential creation of approximate lines until a sign of a coefficient becomes negative. If a negative sign of a Coefficient is detected for an approximate line, a point of intersection between this approximate line and the response waveform is defined as the rise-up point Pksul(1). Then, an approximate line y20 (where $y_{20} = a_{20} \cdot x + b_{20}$) is created based on a number of data, ranging from 10 data to 70 data which exist in a left side starting from the rise-up point Pksul(1).

Figure 8:
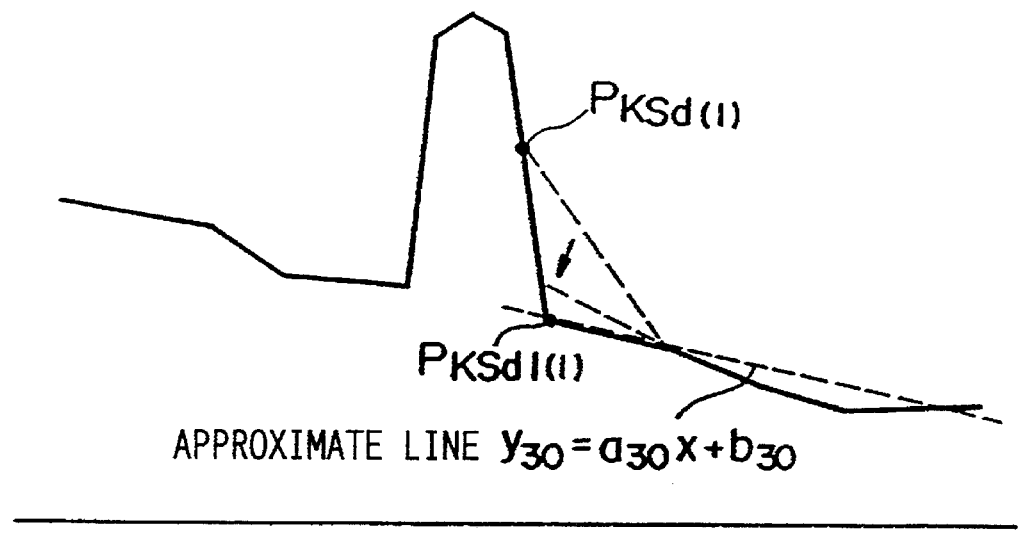
FIG. 8 shows a selected part of the response waveform shown in FIG. 6 which is used to explain detection of a fall-down point of Fresnel's reflection.

Next, a method of detection for the fall-down point Pksdl(1) will be explained in conjunction with FIG. 8.

At first, an approximate line is created based on 60 data which exist in a far-end side (i.e., right side of FIG. 8) starting from the rise-up point Pksdl(1). Then, a coefficient, representing a gradient of the approximate line, is compared to the coefficient $a_{20}$ of the aforementioned approximate line $y_{20}$. If an absolute value of the coefficient of the approximate line is 3 times greater than an absolute value of the coefficient $a_{20}$, a set of 60 data are shifted in the right side by some number of data to determine a next set of 60 data, by which a next approximate line is created.

The CPU 18 repeats process for creation of an approximate line, described above, until an absolute value of a coefficient of the approximate line created becomes less than 3 times the absolute value of the coefficient $a_{20}$. If an absolute value of a coefficient of an approximate line is less than 3 times the absolute value of the coefficient $a_{20}$, a point of intersection between the approximate line and response waveform is defined as the fall-down point Pksdl(1). Then, an approximate line $y_{30}$ (where $y_{30} = a_{30} \cdot x + b_{30}$) is created based on 10 to 70 data which exist in the right side starting from the fall-down point Pksdl(1).

Figure 9:
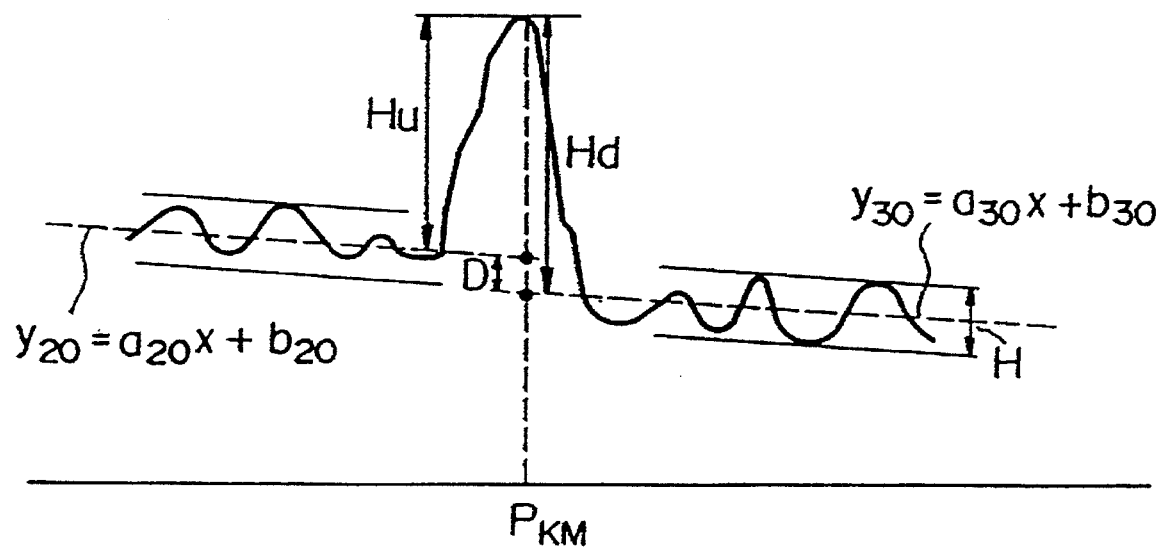
FIG. 9 shows a certain part of a response waveform which is used to explain a method of calculating a connection loss with respect to Fresnel's reflection.

Next, the CPU 18 makes detection as to whether or not data, which provide a maximum value of the response waveform, exist between the rise-up point Pksul(1) and the fall-down point Pksdl(1). FIG. 9 shows that the maximum value of the response waveform appears at a data number $P_{KM}$. In FIG. 9, a value 'Hu' represents a difference between the maximum value and the approximate line $y_{20}$ at the data number $P_{KM}$ while a value 'Hd' represents a difference between the maximum value and the approximate line $y_{30}$ at the data number $P_{KM}$. Based on an amount of noise which is calculated in step S4, a standard value 'H' for the amount of noise is set. Next, the CPU 18 proceeds to step S7 in which based on a conditional expression (4), a decision is made as to whether or not the data number, stored in the RAM 20 by the aforementioned step S5, represents a real Fresnel's reflection.

$$Hu > H \text{ and } Hd > H \quad (4)$$

The CPU 18 determines temporary Fresnel's reflection, which meets the conditional expression, as real Fresnel's reflection. In contrast, the CPU 18 determines temporary Fresnel's reflection, which does not meet the conditional expression, as noise.

Next, the CPU 18 proceeds to step S8 so as to calculate a connection loss which occurs due to provision of a connector in the optical line 12. A peak portion of the response waveform shown in FIG. 9 corresponds to the Fresnel's reflection F(1) which in turn corresponds to a connector provided in the optical line 12, for example. A connection loss 'D' of this connector is defined as a difference between the approximate line $y_{20}$ and the approximate line $y_{30}$ at the data number $P_{KM}$ which provides the maximum value of the response waveform.

Figure 10:
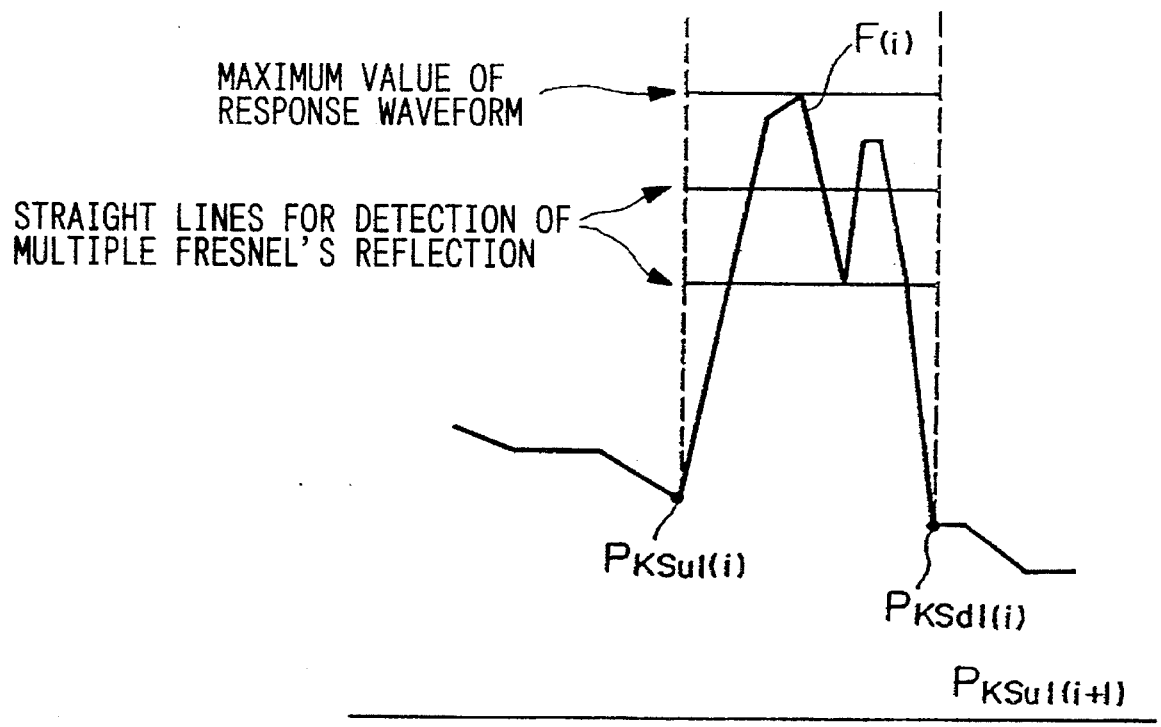
FIG. 10 shows a peak portion of a response waveform which is used to explain detection of multiple Fresnel's reflection.

Thereafter, the CPU 18 proceeds to step S9 so as to make a decision as to whether or not the real Fresnel's reflection, which is detected by the step S7, indicates multiple reflection. FIG. 10 shows an example of a response waveform which represents multiple Fresnel's reflection. Herein, a plurality of peaks appear with respect to one real Fresnel's reflection. Detection for existence of multiple reflection is made, using two detection lines 1 and 2, with respect to a selected range of a response waveform which is defined between a rise-up point Pksul(i) and a fall-down point Pksdl(i) in connection with real Fresnel's reflection F(i) arbitrarily selected. Herein, the detection line 1 is a horizontal line whose level is lower than a maximum value of the response waveform, shown in FIG. 10, by 4 dB. In addition, the detection line 2 is a horizontal line whose level is lower than the maximum value of the response waveform by 8 dB. If the response waveform crosses the detection line by 2 or more points of intersection, the CPU 18 determines that multiple reflection occurs. So, a data number (indicating a certain position of the optical line 12) which corresponds to a maximum value at each peak of the response waveform is detected as a position of real Fresnel's reflection.

In the step S10, the CPU 18 detects a real end which represents an accurate position of a terminal end of the optical line 12. Herein, the real end is calculated by making a correction to the temporary end ND which is detected in step S3. That is, the CPU 18 performs evaluation on a fall-down point Pksdm, regarding the last Fresnel's reflection, and the temporary end ND in accordance with conditional expressions, as follows:

$$ND - Pksdm \leq 10 \quad (5)$$

$$10 < ND - Pksdm \leq 300 \quad (6)$$

$$ND - Pksdm > 300 \quad (7)$$

If the conditional expression (5) is satisfied, the real end is set at a rise-up point Pksum; if the conditional expression (6) is satisfied, real-end detection is performed again using a specific process which will be described later; and if the conditional expression (7) is satisfied, the real end is set at the temporary end ND. Incidentally, if multiple Fresnel's reflection occurs in the case of the conditional expression (5), the real end is set at a point which is obtained by subtracting a difference between 2 points of multiple Fresnel's reflection from the rise-up point Pksum.

Figure 11:
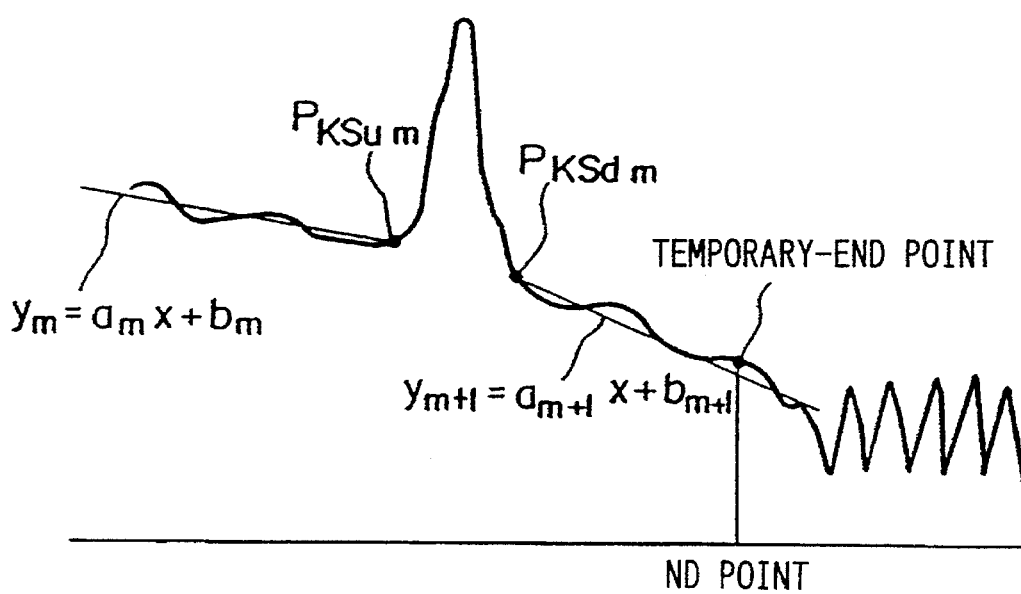
FIG. 11 shows a certain part of a response waveform which is used to explain a method of determining a real end of an optical line.
Figure 12:
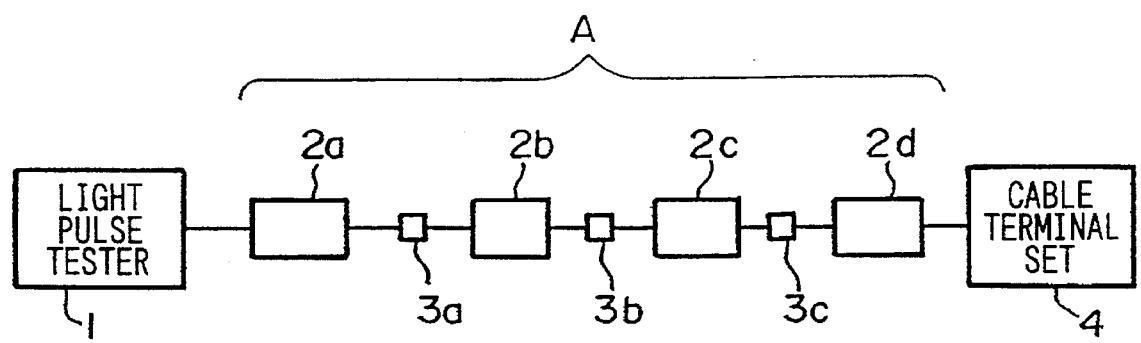
FIG. 12 is a block diagram showing a configuration of a conventional optical line testing device.
Figure 13:
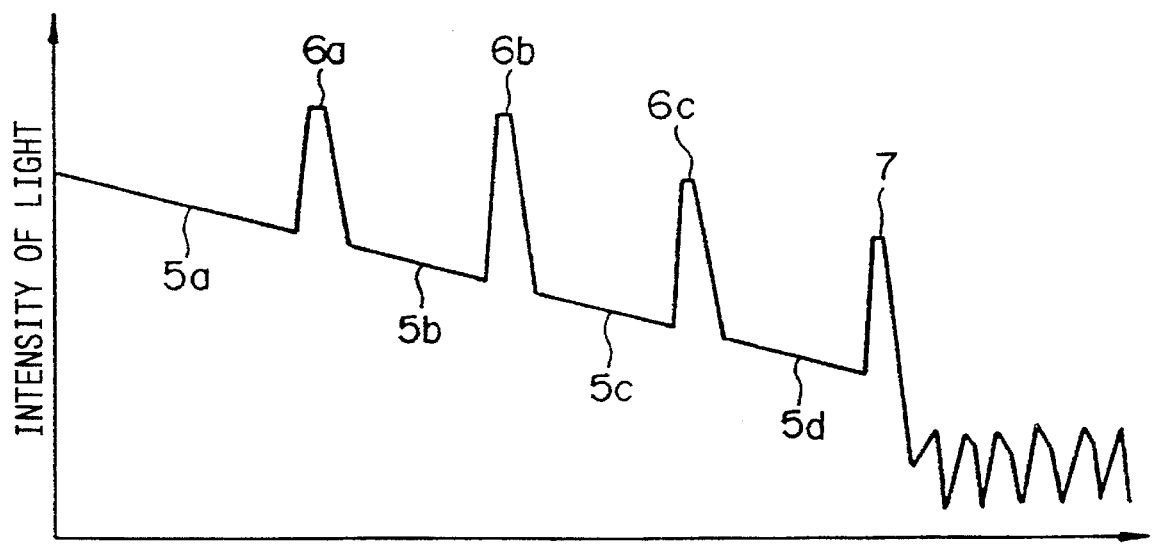
FIG. 13 is a graph showing a response waveform of response light which is outputted from an optical line and is measured by the conventional optical line testing device.
Figure 14:
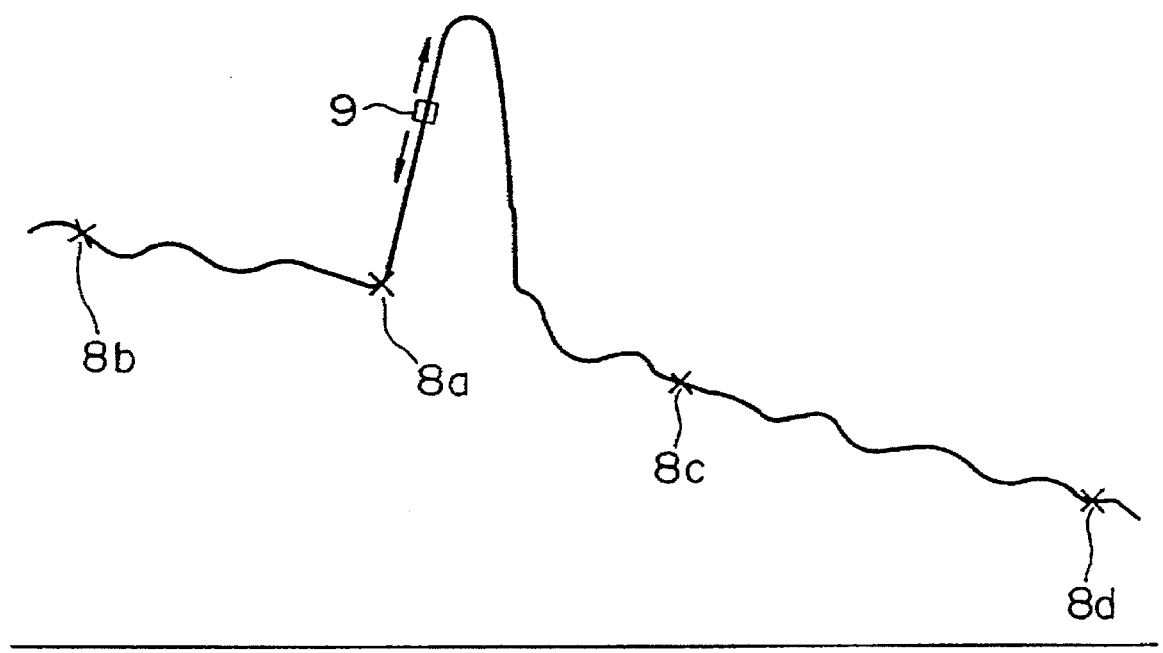
FIG. 14 is an enlarged view showing a selected part of the response waveform shown in FIG.

Details of the specific process which is used in the case of the conditional expression (6) will be explained with reference to FIG. 11. Herein, an approximate line $y_m$ (where $y_m = a_m x + b_m$) is created with respect to a left side of a response waveform starting from the rise-up point Pksum while an approximate line $y_{m+1}$ (where $y_{m+1} = a_{m+1} x + b_{m+1}$) is created between the fall-down point Pksdm and a temporary-end point of the response waveform corresponding to the temporary end ND. Then, a coefficient $a_{m+1}$ is compared to a coefficient $a_m$, so that a position of a real end is determined using conditional expressions, as follows:

$$|a_{m+1}| \leq 5 \cdot |a_m| : \text{read end} = Pksum \quad *8)$$

$$|a_{m+1}| < \cdot |a_m| : \text{read end} = ND \quad (9)$$

Namely, the real end is set at the rise-up point Pksum if the conditional expression (8) is satisfied; but the real end is set at the temporary end ND if the conditional expression (9) is satisfied.

Lastly, the CPU 18 proceeds to step S11 in which the RAM stores data representing the real Fresnel's reflection, real end and connection loss which are automatically calculated by the aforementioned steps.

The content of the data which are automatically calculated are visually displayed on the screen of the display unit 16 in accordance with manipulation of the operation panel 17. In addition, the data can be stored in a floppy disk by the floppy-disk drive unit 21 in accordance with a certain format.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds are therefore intended to be embraced by the claims.

What is claimed is:

1. An optical line testing device comprising:

light emitting means for emitting light pulses radiated to an optical line;

light receiving means for receiving response light, corresponding to each of the light pulses reflected by the optical line, for a predetermined period of time, and for converting the response light to a plurality of waveform data;

waveform processing means for averaging the plurality of waveform data to create averaged data;

memory means for storing the averaged data;

display means for visually displaying a response waveform, corresponding to the response light, based on the averaged data read out from the memory means; and analyzing means for analyzing the response waveform to detect a property of the optical line, the analyzing means sets a data range defined between first data and last data selected from among the averaged data representing the response waveform, partitions the data range into a plurality of regions, and calculates an approximate line, using a method of least squares, with respect to each of the regions, the analyzing means performs comparison using a threshold value, which is set responsive to a level of the approximate line at the last data, to detect a plurality of data whose levels are higher than the threshold value, the analyzing means determines a terminal end of the optical line based on one data, among the plurality of data, that corresponds to a farthest side of the optical line.

2. An optical line testing device comprising:

light emitting means for emitting light pulses radiated to an optical line;

light receiving means for receiving response light, corresponding to each of the light pulses reflected by the optical line, for a predetermined period of time, and for converting the response light to a plurality of waveform data;

waveform processing means for averaging the plurality of waveform data to create averaged data;

memory means for storing the averaged data;

display means for visually displaying a response waveform, corresponding to the response light, based on the averaged data read out from the memory means; and analyzing means for analyzing the response waveform to detect a property of the optical line, the analyzing means sets a data range defined between first data and last data selected from among the averaged data representing the response waveform, partitions the data range into a plurality of regions, and calculates an approximate line, using a method of least squares, with respect to each of the regions, the analyzing means performs comparison using a straight line, formed based on the approximate line added with a constant which is set responsive to a deviation between the approximate line and an average value among the averaged data belonging to each region, to determine positions of Fresnel's reflections by detecting points of intersection of the straight line and the response waveform.

3. An optical line testing device comprising:

light emitting means for emitting light pulses radiated to an optical line;

light receiving means for receiving response light, corresponding to each of the light pulses reflected by the optical line, for a predetermined period of time, and for converting the response light to a plurality of waveform data;

waveform processing means for averaging the plurality of waveform data to create averaged data;

memory means for storing the averaged data;

display means for visually displaying a response waveform, corresponding to the response light, based on the averaged data read out from the memory means; and analyzing means for analyzing the response waveform to detect a property of the optical line, the analyzing means sets a data range defined between first data and last data selected from among the averaged data representing the response waveform, partitions the data range into a plurality of regions, and calculates an approximate line, using a method of least squares, with respect to each of the regions, the analyzing means performs comparison using a straight line, formed based on the approximate line added with a constant which is set responsive to a deviation between the approximate line and an average value among the averaged data belonging to each region, to determine a position of Fresnel's reflection, the analyzing means uses two approximate lines, formed with respect to two sides of a peak portion of the response waveform corresponding to the position of Fresnel's reflection, to calculate a connection loss based on a difference in level between the two approximate lines at the position of Fresnel's reflection.

4. An optical line testing device comprising:

light emitting means for emitting light pulses radiated to an optical line;

light receiving means for receiving response light, corresponding to each of the light pulses reflected by the optical line, for a predetermined period of time, and for converting the response light to a plurality of waveform data;

waveform processing means for averaging the plurality of waveform data to create average data;

memory means for storing the averaged data;

display means for visually displaying a response waveform corresponding to the response light, based on the averaged data read out from the memory means; and analyzing means for analyzing the response waveform to detect a property of the optical line, the analyzing means sets a data range defined between first data and last data selected from among the averaged data representing the response waveform, partitions the data range into a plurality of regions, and calculates an approximate line, using a method of least squares, with respect to each of the regions, the analyzing means performs comparison using a straight line, formed based on the approximate line added with a constant which is set responsive to a deviation between the approximate line and an average value among the averaged data belonging to each region, to determine a position of Fresnel's reflection, the analyzing means evaluating a peak portion of the response waveform corresponding to the position of Fresnel's reflection to detect an occurrence of multiple Fresnel's reflection.

5. An optical line testing method comprising the steps of:

radiating light pulses to an optical line;

receiving response light, corresponding to each of the light pulses reflected by the optical line, for a predetermined period of time;

converting the response light to a plurality of waveform data;

averaging the plurality of waveform data to create averaged data;

visually displaying a response waveform, corresponding to the response light, based on the averaged data; and analyzing the response waveform to detect a property of the optical line, the analyzing step comprising the substeps of setting a data range defined between first data and last data selected from among the averaged data representing the response waveform, partitioning the data range into a plurality of regions, calculating an approximate line, using a method of least squares, with respect to each of the regions, performing comparison using a threshold value, which is set responsive to a level of the approximate line at the last data, detecting a plurality of data whose levels are higher than the threshold value, and determining a terminal end of the optical line based on one data, among the plurality of data, that corresponds to a farthest side of the optical line.

6. An optical line testing method comprising the steps of:

radiating light pulses to an optical line;

receiving response light, corresponding to each of the light pulses reflected by the optical line, for a predetermined period of time;

converting the response light to a plurality of waveform data;

averaging the plurality of waveform data to create averaged data;

visually displaying a response waveform, corresponding to the response light, based on the averaged data; and analyzing the response waveform to detect a property of the optical line, the analyzing step comprising the substeps of setting a data range defined between first data and last data selected from among the averaged data representing the response waveform, partitioning the data range into a plurality of regions, calculating an approximate line, using a method of least squares, with respect to each of the regions, forming a straight line based on the approximate line added with a constant which is set responsive to a deviation between the approximate line and an average value among the averaged data belonging to each region.

performing comparison between the response waveform and the straight line to detest points of intersection of the straight line and the response waveform, and determining positions of Fresnel's reflections based on a result of the comparison.

7. An optical line testing method comprising the steps of:

radiating light pulses to an optical line;

receiving response light, corresponding to each of the light pulses reflected by the optical line, for a predetermined period of time;

converting the response light to a plurality of waveform data;

averaging the plurality of waveform data to create averaged data;

visually displaying a response waveform, corresponding to the response light, based on the averaged data; and analyzing the response waveform to detect a property of the optical line, the analyzing step comprising the substeps of setting a data range defined between first data and last data selected from among the averaged data representing the response waveform, partitioning the data range into a plurality of regions, calculating an approximate line, using a method of least squares, with respect to each of the regions, forming a straight line based on the approximate line added with a constant which is set responsive to a deviation between the approximate line and an average value among averaged data belonging to each region, performing comparison between the straight line and the response waveform, determining a position of Fresnel's reflection based on a result of the comparison;

forming two approximate lines with respect to two sides of a peak portion of the response waveform corresponding to the position of Fresnel's reflection, and calculating a connection loss based on a difference in level between the two approximate lines at the position of Fresnel's reflection.

8. An optical line testing method comprising the steps of:

radiating light pulses to an optical line;

receiving response light, corresponding to each of the light pulses reflected by the optical line, for a predetermined period of time;

converting the response light to a plurality of waveform data averaging the plurality of waveform data to create averaged data;

visually displaying a response waveform, corresponding to the response light, based on the averaged data; and analyzing the response waveform to detect a property of the optical line, the analyzing step comprising the substeps of setting a data range defined between first data and last data selected from among the averaged data representing the response waveform, partitioning the data range into a plurality of regions, calculating an approximate line, using a method of least squares, with respect to each of the regions, forming a straight line based on the approximate line added with a constant which is set responsive to a deviation between the approximate line and an average value among the averaged data belonging to each region, performing comparison between the straight line and the response waveform, determining a position of Fresnel's reflection based on a result of the comparison, and detecting an occurrence of multiple Fresnel's reflection by evaluating a peak portion of the response waveform corresponding to the position of Fresnel's reflection.

* * * * *

UNITED STATES PATENT AND TRADEMARK OFFICE
CERTIFICATE OF CORRECTION

PATENT NO. : 5,668,627
DATED : September 16, 1997
INVENTOR(S) : Takao Minami

It is certified that error appears in the above-indentified patent and that said Letters Patent is hereby corrected as shown below:

On the Title Page, Item [57], in the Abstract, Line 20, "Fresne's" should read --Fresnel's--;

Claim 4, Column 14, Line 10, "average" should read --averaged--;

Claim 6, Column 15, Line 21, "region." should read --region,--;

Claim 6, Column 15, Line 23, "detest" should read --detect--;

Claim 7, Column 16, Line 2, after "among", insert --the--;

Claim 8, Column 16, Line 21, after "data", insert --;--.

Signed and Sealed this

Third Day of March, 1998

Attest:

BRUCE LEHMAN

*Attesting Officer*    *Commissioner of Patents and Trademarks*